(12) United States Patent
Steinle

(10) Patent No.: US 8,326,495 B2
(45) Date of Patent: Dec. 4, 2012

(54) METHOD OF REGULATING A CHASSIS OF A MOTOR VEHICLE, REGULATING SYSTEM FOR A MOTOR VEHICLE, AND MOTOR VEHICLE

(75) Inventor: Christian Steinle, Fellbach (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 877 days.

(21) Appl. No.: 12/325,654

(22) Filed: Dec. 1, 2008

(65) Prior Publication Data
US 2009/0143945 A1 Jun. 4, 2009

(30) Foreign Application Priority Data
Nov. 30, 2007 (DE) .......................... 10 2007 057 822

(51) Int. Cl.
*G06F 17/00* (2006.01)
(52) U.S. Cl. ............... 701/48; 701/36; 701/37; 701/38; 701/70; 701/71; 303/194
(58) Field of Classification Search .................. None
See application file for complete search history.

(56) References Cited

U.S. PATENT DOCUMENTS

| | | | | | |
|---|---|---|---|---|---|
| 2,283,713 | A | * | 5/1942 | Wolf | 188/10 |
| 4,740,039 | A | * | 4/1988 | Hattwig | 303/9.75 |
| 4,741,554 | A | * | 5/1988 | Okamoto | 280/5.513 |
| 5,696,677 | A | * | 12/1997 | Leaphart et al. | 701/37 |
| 2003/0100979 | A1 | * | 5/2003 | Lu et al. | 701/36 |
| 2003/0125858 | A1 | * | 7/2003 | Lin et al. | 701/50 |
| 2003/0218378 | A1 | * | 11/2003 | Tanaka et al. | 303/146 |
| 2004/0019423 | A1 | * | 1/2004 | Yasui et al. | 701/71 |
| 2006/0064213 | A1 | * | 3/2006 | Lu et al. | 701/37 |
| 2006/0170281 | A1 | * | 8/2006 | Hattori et al. | 303/20 |
| 2007/0034464 | A1 | * | 2/2007 | Barefoot | 188/322.15 |

FOREIGN PATENT DOCUMENTS

| | | |
|---|---|---|
| DE | 4014561 A1 | 11/1991 |
| DE | 4303160 A1 | 8/1994 |
| DE | 10360666 A1 | 7/2005 |

OTHER PUBLICATIONS

R. Gscheidle, "Fachunde Kraftfahrzeugtechnik", Europa-Fachbuchreihe for Kraftfahrezeugtechnik, , 2004, pp. 24-28, vol. 20108, Nourney Vollmar GmbH & Co. KG, Haan-Gruiten Germany.

* cited by examiner

*Primary Examiner* — Khoi Tran
*Assistant Examiner* — Jonathan L Sample
(74) *Attorney, Agent, or Firm* — Leydig, Voit & Mayer, Ltd.

(57) ABSTRACT

In a regulating system and method of regulating the chassis of a motor vehicle, sensor data which are present for regulating the suspension and the damping of a vehicle body vehicle and describe the suspension state are forwarded to the regulating module of an antilock brake system. A state of the motor vehicle with regard to a brow situation can be determined from the sensor data. The sensor data or the state with regard to the brow situation are/is taken into consideration in the regulating module of the antilock brake system when determining control signals for regulating the brake pressure in brake apparatuses which are assigned to the wheels, in particular in the brake cylinders. This increases the driving safety considerably when driving over a brow and immediately after driving over a brow and increases the efficiency and reliability of the antilock brake system substantially in corresponding driving situations.

5 Claims, 2 Drawing Sheets

METHOD OF REGULATING A CHASSIS OF A MOTOR VEHICLE, REGULATING SYSTEM FOR A MOTOR VEHICLE, AND MOTOR VEHICLE

CROSS-REFERENCE TO RELATED APPLICATION

This application claims the priority, under 35 U.S.C. §119, of German application DE 10 2007 057 822.0, filed Nov. 30, 2007; the prior application is herewith incorporated by reference in its entirety.

BACKGROUND OF THE INVENTION

Field of the Invention

The invention relates to a method of regulating a chassis of a motor vehicle. Sensor data relating to a suspension state of the motor vehicle is determined in order to regulate the suspension and damping of the body of the motor vehicle, and an antilock brake system provides control signals for regulating the pressure in a brake system of the motor vehicle as a function of the slip of the wheels of the motor vehicle. The invention also relates to a corresponding regulating system for a motor vehicle, in particular for a chassis of the motor vehicle, and to a motor vehicle.

Published, non-prosecuted German patent application DE 43 03 160 A1 discloses a system for regulating and/or controlling the chassis of a motor vehicle. At least one actuator is attached as a support system between the vehicle body and at least one wheel, and a regulating and/or control device is provided, by which the actuator is loaded as a function of variables which represent the driving state of the vehicle, in order to apply forces between the vehicle body and the wheel. Here, variables which represent the driving state of the vehicle are detected with the aid of a sensor, it is proposed, for example, to detect the relative movement between the vehicle body and the wheels and/or the vertical acceleration of the vehicle body.

The use of antilock brake systems is widespread in automotive technology. A fundamental regulating circuit of an antilock brake system for setting the brake pressure in a brake system of a motor vehicle is described, for example, in the reference titled "Fachkunde Kraftfahrzeugtechnik" [Special Knowledge, Automotive Technology], page 467 et seq., 28th edition, 2004, Europa-Lehrmittel publishing house, Haan-Gruiten.

SUMMARY OF THE INVENTION

It is accordingly an object of the invention to provide a method of regulating a chassis of a motor vehicle, a regulating system for a motor vehicle, and a motor vehicle which overcome the above-mentioned disadvantages of the prior art methods and devices of this general type, which improve the functionality of an antilock brake system and increases the driving safety in specific driving situations.

With the foregoing and other objects in view there is provided, in accordance with the invention, a method for regulating a chassis of a motor vehicle. The method includes the steps of determining sensor data relating to a suspension state of the motor vehicle for regulating a suspension and damping of a body of the motor vehicle; forwarding at least one of the sensor data relating to the suspension state of the motor vehicle and signals determined from the sensor data to an antilock brake system; and providing, via the antilock brake system, control signals for regulating pressure in a brake system of the motor vehicle in dependence on a slip of wheels of the motor vehicle.

According to the invention, in a regulating method of the type which is mentioned in the introduction, sensor data with respect to the suspension state of the motor vehicle and/or signals which are determined from the sensor data are forwarded to the antilock brake system. In this way, information which has already been used in the context of damper regulation or for actuating actuators of a support system can also be used to improve the functionality and to increase the efficiency of an antilock brake system.

One or more of the following data items can advantageously be used as sensor data with respect to the suspension state: the levels of one or more wheels of the motor vehicle and/or at least one body acceleration of the motor vehicle. This makes possible an improvement in the method of operation of the antilock brake system and, in particular, an improved brake behavior of the motor vehicle when driving over a brow or immediately after driving over a brow.

In a regulating system according to the invention, at least one module for damper regulation is provided for the suspension system of a motor vehicle, an antilock brake system being provided for the brake system of the motor vehicle, which antilock brake system has a regulating module which is coupled to the module for damper regulation in such a way that the regulating module of the antilock brake system takes the state of the suspension system into consideration when regulating the brake pressure. A particularly efficient regulating system is provided in this way.

In accordance with an added mode of the invention, there is the step of providing a body acceleration of a front part of the motor vehicle as the body acceleration.

In accordance with another mode of the invention, there is the step of deriving the signals from the sensor data regarding the suspension state and forwarding the signals to the antilock brake system, the signals describing a brow situation.

In accordance with a further mode of the invention, the signals contain at least the following states of the brow situation being differentiated: suspicion of brow, brow confirmed and end of the brow.

In accordance with an additional feature of the invention, there is the step of building up pressure up to a fixed operating point which can be parameterized for each axle when the end of the brow state is present in the brake system.

In accordance with another further feature of the invention, there is the step of adapting an operating point rapidly after setting of a parameterized operating point when the end of the brow state is present.

Other features which are considered as characteristic for the invention are set forth in the appended claims.

Although the invention is illustrated and described herein as embodied in a method of regulating a chassis of a motor vehicle, a regulating system for a motor vehicle, and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
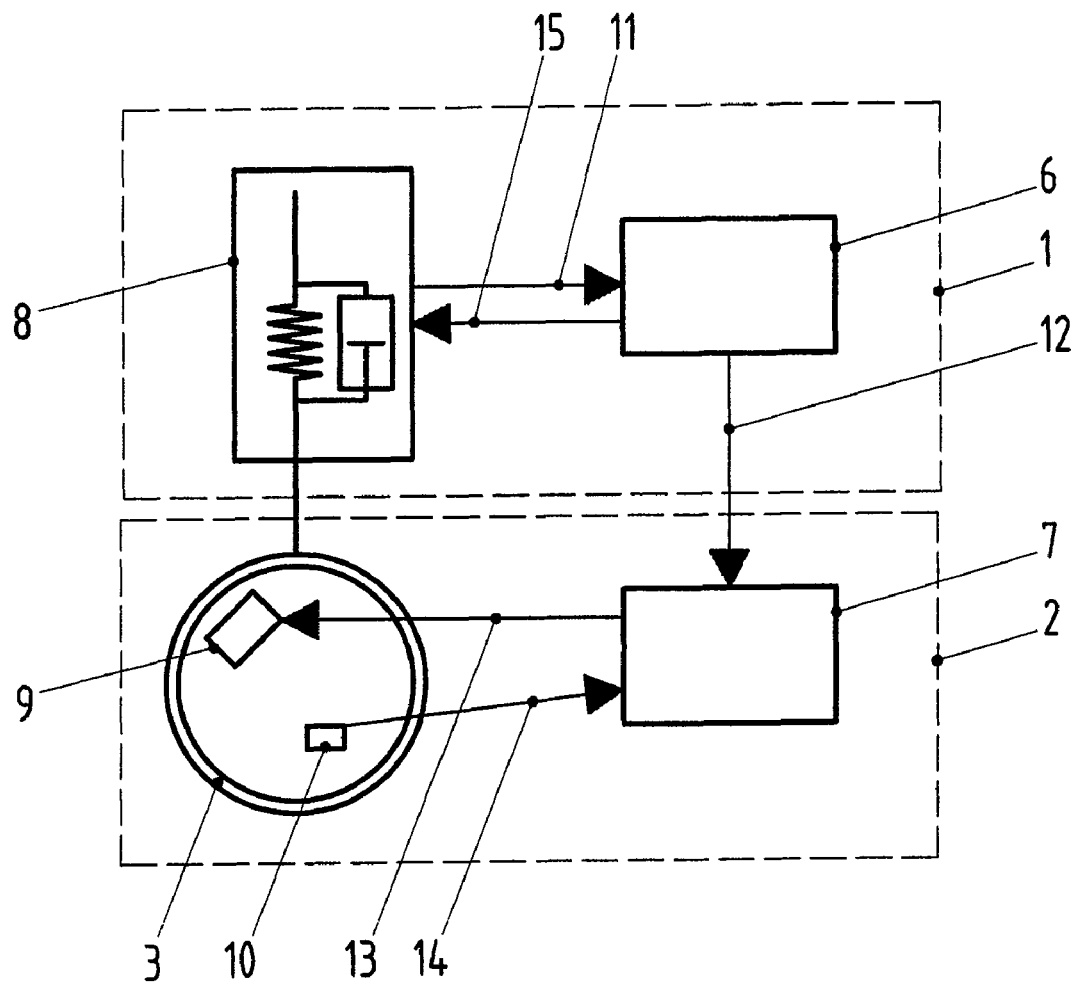
FIG. 1 is an illustration showing parts of a suspension system and parts of a brake system of a motor vehicle according to the invention.

Referring now to the figures of the drawing in detail and first, particularly, to FIG. 1 thereof, there is shown in a simplified and extremely diagrammatic way, parts of a suspension system 1 and parts of a brake system 2 of a motor vehicle.

The brake system 2 has an antilock brake system. A regulating module 7 is part of the antilock brake system. Apart from the regulating module 7, the antilock brake system is not shown in greater detail in the drawing. The regulating module 7 provides control signals 13 for regulating the pressure in the brake system 2. The control signals 13 for regulating the brake pressure are preferably determined as a function of the slip of the wheels 3 of the motor vehicle. For this purpose, in each case one or more sensors 10 which forward signals 14 to the regulating module 7 of the antilock brake system are preferably provided in the region of the wheels 3. The control signals 13 for regulating the pressure in the brake system 2 can be forwarded from the regulating module 7 to one or more brake cylinders 9, for example, with the aid of a solenoid valve which is not shown in greater detail. The wheels 3 of the motor vehicle can be assigned, for example, in each case one brake cylinder 9. At least one brake cylinder 9 is preferably provided per wheel 3.

The suspension system 1 for the suspension and damping of the vehicle body preferably has at least one apparatus 8 for suspension and damping per wheel 3. An apparatus 8 of this type for suspension and damping can have, for example, as indicated in FIG. 1, one or more helical springs and/or one or more air springs, and one or more adjustable vibration dampers. The apparatus 8 for the suspension and damping of the vehicle body is controlled by a module 6 for damper regulation by control signals 15. Sensor data 11 with respect to the suspension state of the motor vehicle or with respect to the state of the suspension system 1 of the motor vehicle are forwarded to the module 6. The sensor data 11 are detected by sensors (not shown in greater detail) and are forwarded to the module 6 for damper regulation. Sensor data 11 of this type can relate to, for example, the levels of the wheels 3, that is to say therefore data about the compressions. As an alternative or in addition, sensor data 11 of this type can also relate to body accelerations, for example the body acceleration of the front part of the vehicle.

Information with respect to the suspension state is forwarded to the brake system 2 by the suspension system 1 in the form of signals 12. Here, the sensor data 11 which are already present in the suspension system 1 and/or data which are processed further or are determined in the suspension system 1 with the aid of the sensor data 11 can be forwarded as signals 12 to the regulating module 7 of the antilock brake system.

Figure 2A:
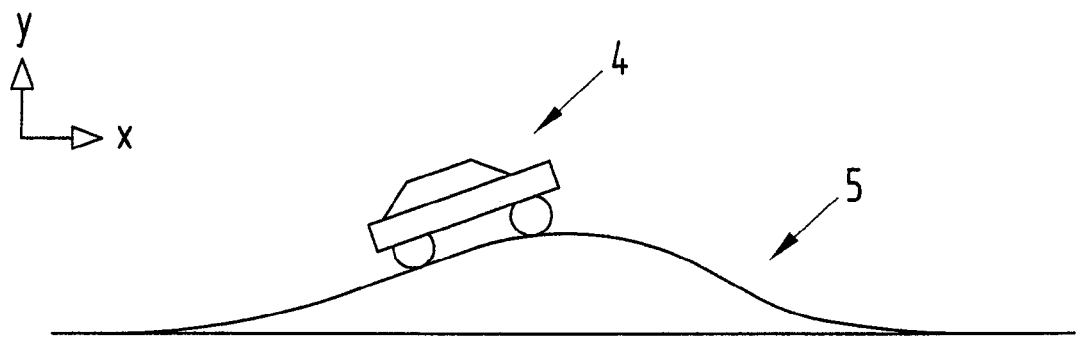
FIGS. 2A, 2B, 2C are illustrations showing the motor vehicle while it is driving over a brow.
Figure 2B:
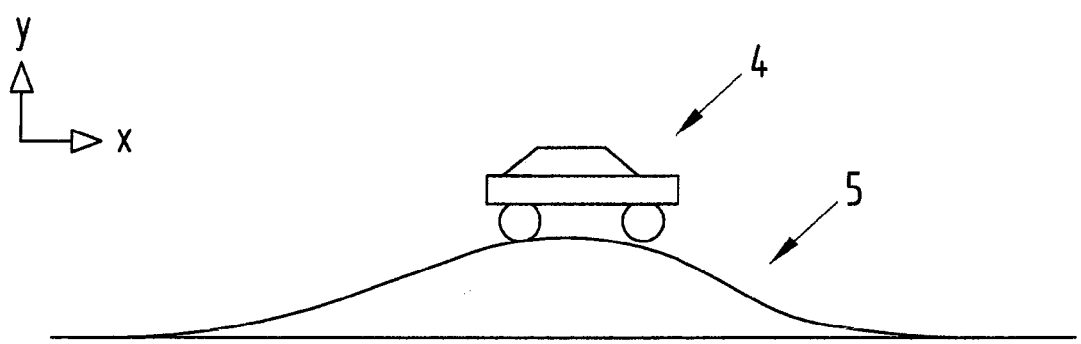
Figure 2C:
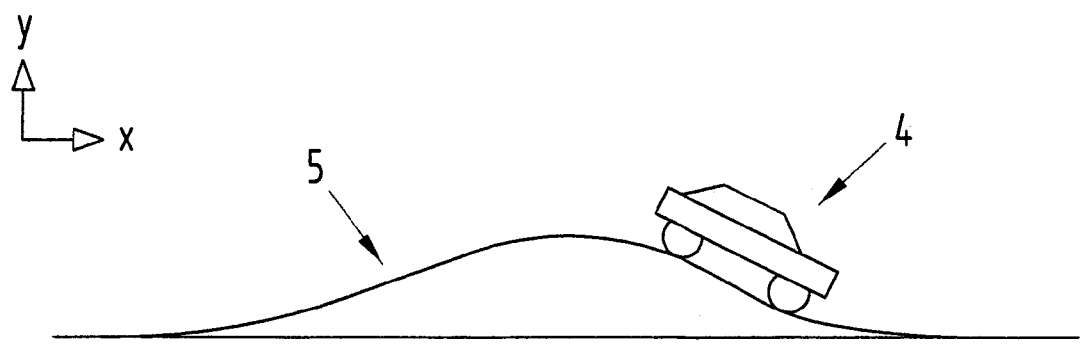

FIGS. 2A to 2C show a motor vehicle 4 while driving over a brow 5 in the driving direction x. In the following text, a vertical acceleration in the height direction y is defined as positive. Suspension travels during compression are likewise defined as positive.

In the situation which is shown in FIG. 2A, the vertical acceleration of the body of the motor vehicle 4 is negative and below a first threshold value. On account of the corresponding sensor data 11, the state "suspicion of brow" can be set in order to describe the present brow situation.

As soon as the rear axle has driven over the point, at which the front axle was situated according to FIG. 2A, that is to say as soon as the vehicle has reached the position which is shown in FIG. 2B, a negative compression exists for the front axle, which negative compression lies below a second threshold value. At the same time, the rear axle has rebounded, that is to say the compression of the rear axle lies below a third threshold value. The state "brow confirmed" is set in order to describe the present brow situation according to FIG. 2B. The sensor data 11 are used in order to determine the state.

As soon as the body acceleration has exceeded a fourth threshold value and the compression at the front has exceeded a fifth threshold value, the state "end of the brow" can be set in order to describe the present brow situation according to FIG. 2C. The motor vehicle 4 has landed again in FIG. 2C.

The signals 12 which the suspension system 1 forwards to the brake system 2 can assume values which correspond to the states "suspicion of brow", "brow confirmed" and "end of the brow". In an alternative refinement, the signals 12 can directly correspond to the sensor data 11. It is possible as an alternative that the signals 12 assume other values which are determined using the sensor data 11.

The method of operation of the regulation of the antilock brake system can be improved with the use of the signals 12 which are provided by the damper regulation. To this end, the regulation of an antilock brake system which is known from the prior art can preferably be modified as follows:

In the state "end of the brow", the pressure is built up as rapidly as possible in the brake system as far as a fixed operating point which can be parameterized for each axle of the motor vehicle 4. Subsequently, the regulator dynamics can be increased for a defined, preferably parameterized time period, in order to make rapid adaptation possible.

One of the concepts which are important to the invention can be summarized as follows: the invention relates to a regulating system and a regulating method for the chassis of a motor vehicle 4, the sensor data 11 which are present for regulating the suspension and the damping of the body of the motor vehicle 4 and describe the suspension state of the motor vehicle 4 being forwarded to the regulating module 7 of an antilock brake system of the motor vehicle 4. A state of the motor vehicle with regard to a brow situation can be determined from the sensor data 11. The sensor data 11 or the state with regard to the brow situation are/is taken into consideration in the regulating module 7 of the antilock brake system when determining control signals 13 for regulating the brake pressure in brake apparatuses which are assigned to the wheels 3, in particular in the brake cylinders 9. According to the invention, information with respect to the suspension state is not only used, as is known from the prior art, in the context of the regulation of the suspension and damping of the body of the motor vehicle, but information with respect to the suspension state is also used for regulating the brake system 2. To this end, sensor data 11 which are present in the suspension system 1 and/or signals 12 which are determined in the suspension system 1 with the aid of the sensor data 11 are forwarded to the regulating module 7 of the antilock brake system. The invention increases the driving safety considerably when driving over a brow and immediately after driving over a brow and increases the efficiency and reliability of the antilock brake system substantially in corresponding driving situations.

The invention claimed is:

1. A method for regulating a chassis of a motor vehicle, which comprises the steps of:
   determining sensor data relating to a suspension state of the motor vehicle for regulating a suspension and damping of a body of the motor vehicle, the sensor data relating to the suspension state including at least one of levels of at least one wheel of the motor vehicle and a body acceleration of a front part of the motor vehicle;
   forwarding at least one of the sensor data relating to the suspension state of the motor vehicle and signals determined from the sensor data regarding the suspension state to an antilock brake system, the signals describing a brow situation;
   providing, via the antilock brake system, control signals for regulating pressure in a brake system of the motor vehicle in dependence on a slip of wheels of the motor vehicle; and
   building up pressure up to a fixed operating point which can be parameterized for each axle when an end of the brow state is present in the brake system.

2. The method according to claim 1, wherein the signals contain at least the following states of the brow situation being differentiated: suspicion of brow, brow confirmed and end of the brow.

3. The method according to claim 2, which further comprises adapting an operating point rapidly after setting of a parameterized operating point when the end of the brow state is present.

4. A regulating system for a motor vehicle having a vehicle body, a suspension system for suspension and damping of the vehicle body, and a brake system, the regulating system comprising:
   at least one module for damper regulation coupled to the suspension system; and
   an antilock brake system coupled to the brake system, said antilock brake system having a regulating module, said regulating module configured to determine signals for regulating a brake pressure, said regulating module coupled to said module for damper regulation such that said regulating module takes a state of the suspension system into consideration when determining the signals for regulating the brake pressure, said regulating module configured to:
      receive sensor data relating to a suspension state of the motor vehicle for regulating the suspension and damping of the vehicle body of the motor vehicle, the sensor data relating to the suspension state including at least one of levels of at least one wheel of the motor vehicle and a body acceleration of a front part of the motor vehicle;
      forward at least one of the sensor data relating to the suspension state of the motor vehicle and signals determined from said sensor data regarding the suspension state to said antilock brake system, the signals describing a brow situation;
      provide, via said antilock brake system, control signals for regulating the brake pressure in the brake system in dependence on a slip of wheels of the motor vehicle; and
      build up pressure up to a fixed operating point which can be parameterized for each axle when an end of the brow state is present in the brake system.

5. A motor vehicle, comprising:
   wheels;
   a vehicle body;
   a chassis having suspension system for suspension and damping of said vehicle body;
   a brake system for said wheels; and
   a regulating system having at least one module for damper regulation being provided for said suspension system and an antilock brake system coupled to said brake system, said antilock brake system having a regulating module, said regulating module configured in to determine control signals for regulating a brake pressure, said regulating module coupled to said module for damper regulation such that said regulating module takes a state of said suspension system into consideration when determining the control signals for regulating the brake pressure, said regulating module configured to:
      receive sensor data relating to a suspension state of the motor vehicle for regulating said suspension system and damping of said vehicle body, the sensor data relating to the suspension state including at least one of levels of at least one wheel of the motor vehicle and a body acceleration of a front part of the motor vehicle;
      forward at least one of the sensor data relating to the suspension state and signals determined from said sensor data regarding the suspension state to said antilock brake system, the signals describing a brow situation;
      provide, via said antilock brake system, the control signals for regulating the brake pressure in said brake system in dependence on a slip of said wheels of the motor vehicle; and
      build up pressure up to a fixed operating point which can be parameterized for each axle when an end of the brow state is present in said brake system.

* * * * *